United States Patent
Fujimoto et al.

(10) Patent No.: US 6,370,915 B1
(45) Date of Patent: Apr. 16, 2002

(54) METHOD FOR SUPPLYING GLASS MOLDING MATERIAL TO MOLDS, AND METHOD FOR MANUFACTURING GLASS OPTICAL ELEMENTS

(75) Inventors: Tadayuki Fujimoto; Kishio Sugawara; Shinichiro Hirota, all of Tokyo (JP)

(73) Assignee: Hoya Corporation (JP)

(*) Notice: Subject to any disclaimer, the term of this patent is extended or adjusted under 35 U.S.C. 154(b) by 0 days.

(21) Appl. No.: 09/512,292

(22) Filed: Feb. 24, 2000

Related U.S. Application Data

(63) Continuation of application No. 09/080,719, filed on May 19, 1998, now abandoned.

(30) Foreign Application Priority Data

May 20, 1997 (JP) .............................................. 9-129298

(51) Int. Cl.$^7$ .............................................. C03B 40/04
(52) U.S. Cl. .............................. 65/25.1; 65/66; 65/122; 65/208; 65/303; 65/304; 65/323
(58) Field of Search .......................... 65/25.1, 66, 122, 65/208, 303, 304, 323

(56) References Cited

U.S. PATENT DOCUMENTS

| | | | |
|---|---|---|---|
| 1,623,362 A | * 4/1927 | Rule | 65/127 |
| 1,853,003 A | * 4/1932 | Howard | 65/127 |
| 1,905,468 A | * 4/1933 | Howard | 65/127 |
| 2,020,623 A | * 11/1935 | Stenhouse | 65/122 |
| 2,041,222 A | * 5/1936 | Bates | 65/123 |
| 3,472,642 A | * 10/1969 | Irwin | 65/323 |
| 3,764,289 A | * 10/1973 | Brymer, Jr. | 65/304 |
| 3,787,196 A | * 1/1974 | Becker et al. | 65/164 |
| 3,857,691 A | * 12/1974 | Jones et al. | 65/303 |
| 3,961,927 A | * 6/1976 | Alderson et al. | 65/25.1 |
| 4,120,683 A | * 10/1978 | Irwin | 65/207 |
| 5,394,910 A | * 3/1995 | Sweetland | 141/98 |
| 5,728,188 A | * 3/1998 | Warnecke | 65/17.1 |
| 5,762,673 A | * 6/1998 | Hirota et al. | 65/25.1 |
| 5,788,732 A | * 8/1998 | Nomura et al. | 65/64 |
| 6,141,991 A | * 11/2000 | Fujimoto et al. | 65/29.19 |

FOREIGN PATENT DOCUMENTS

| | | | |
|---|---|---|---|
| JP | 6-340430 | * | 12/1994 |
| JP | 8-133758 | * | 5/1996 |
| JP | 8-259242 | * | 10/1996 |

* cited by examiner

Primary Examiner—Sean Vincent
(74) Attorney, Agent, or Firm—Burnes, Doane, Swecker & Mathis LLP

(57) ABSTRACT

A method for supplying a glass molding material by dropping it from a higher level onto a molding surface of a lower mold of a mold constituted of an upper mold and the lower mold, in which a guide means is used for dropping the glass molding material and is disposed at a position such that the glass molding material drops onto the molding surface of the lower mold, and the guide means used for this method are disclosed. Moreover, a method for supplying a glass molding material to a molding surface of a lower mold of a mold constituted of an upper mold and the lower mold, in which after the glass molding material is supplied to the molding surface of the lower mold the position of the glass molding material is corrected so that the vertical center of the glass molding material substantially coincides with the center point of the molding surface of the lower mold, and a position correcting means used for this method are disclosed. A manufacturing method for glass optical elements in which a glass molding material supplied to a molding surface of a lower mold by the above method is press-molded is disclosed.

27 Claims, 13 Drawing Sheets

(A)

(B)

(C)

METHOD FOR SUPPLYING GLASS MOLDING MATERIAL TO MOLDS, AND METHOD FOR MANUFACTURING GLASS OPTICAL ELEMENTS

This application is a continuation, of application Ser. No. 09/080,719, filed May 19,1988 now abandoned.

FIELD OF THE INVENTION

This invention relates to a method for supplying a glass molding material to molds and an apparatus used for this method. Moreover, this invention relates to a method for manufacturing glass optical elements including glass optical elements such as high precision lenses using the invented method not requiring grinding and polishing after press molding. Particularly, this invention relates to a method for manufacturing, with high productivity, glass optical elements having a higher surface precision.

BACKGROUND OF THE INVENTION

Various molding methods for optical glass elements such as high precision lenses, using precisely fabricated molds made of a mold material, which can be finished to an optical surface, to which softened glass does not adhere, and which does not require grinding or polishing after press molding, have been developed recently. To obtain a required lens, the lens has to satisfy the specification such as lens thickness, outer diameter, eccentricity, as well as of surface shape precision and surface quality (smoothness on the surface). It is better for such a lens to have a good internal quality such as good refractive index and permeability as a matter of course.

To run such a molding method for glass optical elements as business, how much productivity would be gained may be a serious problem. That is, it is critical whether many glass optical elements can be produced in a short period.

One means to improve the productivity is to fabricate plural glass material pieces in parallel, and another means is to shorten the fabrication time for one cycle. Various improved methods have been proposed, respectively. Shortening the fabrication time for one cycle requires shortening heating and cooling periods of the molds, and therefore, various ideas are made to the glass material during molding and the temperature condition among the molding conditions.

For example, Japanese Unexamined Patent Publication No. 7-10,556 (hereinafter referred to as "Related art No. 1") describes a method for press-molding a glass material having a viscosity in a range of $10^7$ to $10^9$ poises with molds heated at a temperature that the glass material indicates a viscosity of $10^{10}$ to $10^{12}$ poises. Japanese Unexamined Patent Publication No. 9-12,317 (hereinafter referred to as "Related art No. 2") describes a method for press-molding a glass material having a viscosity in a range of $10^{5.5}$ to $10^9$ poises with molds heated at a temperature that the glass material indicates a viscosity of $10^8$ to $10^{12}$ poises (provided that the temperature of the molds is lower than that of the glass material).

Each method shortens the cycle time by shortening times for increasing and decreasing temperatures where the temperature of the mold is not raised more than a necessary temperature.

Thus, a method for molding glass optical elements, such as high precision lenses, using molds made from a precisely fabricated mold material, to which softened glass does not adhere and which can be finished to an optical surface, has drawn attentions recently and been developed in a various way.

Moreover, in each method, to prevent the molding surface of the molds from becoming impaired, the glass material heated and softened at a place other than the molds is transferred into the molds before molding and is then molded. For example, the glass molding material pieces are transferred above lower molds of the molds in a form of spherical or "marble" (slightly flatted spherical) shaped preforms by means of floating plates or sucking pads, and are dropped on the molds to be supplied to the molds.

For example, Japanese Unexamined Patent Publication No. 6-340,430 discloses a method transferring molten glass by means of floating plates, made of separable plates horizontally openable, which blow gas from porous member surfaces and supplying the glass to the molds by opening the separable plates over the molds.

Japanese Unexamined Patent Publication No. 8-133,758 discloses a method for supplying glass preforms to molds by dropping the heated, softened glass preforms where the glass preforms are floated, using a floating jig having at least one fine hole for supplying air flow to the bottom thereof and having an opening smaller than, equal to, or larger than the diameter of the glass preforms, by air flow from the fine hole to heat and soften the preforms, or where the glass preforms are softened by heating while floated, using a porous floating jig having a spherical surface close to the curvature of the outer diameter of the glass preform or a flat surface, by air flow from the porous material.

Japanese Unexamined Patent Publication No. 8-259,242 discloses a method for supplying glass preforms by dropping the heated, softened glass preforms where the glass preforms softened by heating while rotatively floated, using a floating jig formed in having a trumpet-shaped upward opening, by air flow blowing out of plural fine holes arranged under a portion around the center of the jig.

However, when the glass molding material is spontaneously dropped to be supplied to the molds (lower molds), the following problems are raised depending on shapes or sizes (weights) of the glass molding materials. For example, a relatively small glass molding material may not drop onto the molding surface of the lower molds but may come out of the molds due to conditions of air flow during the drop or contacts with the floating plates or the like. In the case of an aspherical glass material, the position of the material may shift from the center of the molding surface even if dropped on the lower mold, and if molding is made under such a state, the molding material may not spread evenly in the molds, thereby generating irregular thicknesses and producing defective articles in which the molding material is protruded. Particularly, the glass preform may be rotated or slightly vibrated up and down and right and left while floating by air flow, and therefore, when such a glass preform is dropped, the glass preform is in an unstable state at a time that the preform starts dropping. Therefore, in such cases, the above problem easily occurs.

SUMMARY OF THE INVENTION

The object of the invention is to provide a method and an apparatus capable of preventing a glass molding material from jumping out of molds during dropping of the material when the glass molding material is supplied to the molds by dropping of the material.

It is another object of the invention to provide a method and an apparatus capable of positioning the glass molding material at substantially a center of a molding surface of a lower mold when the glass molding material is supplied to the molds by dropping of the material.

It is a further object of the invention to provide a manufacturing method for glass optical elements preventing a glass molding material from jumping out of a mold and preventing defective articles from being generated in utilizing the above method.

This invention is to provide a method for supplying a glass molding material (hereinafter referred to as "Supplying method No. 1") by dropping the glass molding material downward onto a molding surface of a lower mold of a mold constituted of an upper mold and the lower mold, comprising the steps of using a guide means for dropping the glass molding material and providing the guide means at a position making the glass molding material drop onto a molding surface of the lower mold.

This invention is also to provide a method for supplying a glass molding material (hereinafter referred to as "Supplying method No. 2") onto a molding surface of a lower mold of a mold constituted of an upper mold and the lower mold, characterized in correcting a position of the glass molding material so that a vertical center of the glass molding material and a center point of a molding surface substantially coincide with each other, after the glass molding material is supplied onto the molding surface of the lower mold.

This invention is further to provide a guide means used in a method for supplying a glass molding material by dropping the glass molding material downward onto a molding surface of a lower mold of a mold constituted of an upper mold and the lower mold, characterized in having a guide portion forming a dropping passage of the glass molding material and allowing the glass molding material to be dropped.

This invention is yet further to provide a position correcting means used for a method for correcting a position of a glass molding material to be supplied onto a molding surface of a lower mold of a mold constituted of an upper mold and the lower mold, characterized in having a glass molding material contact portion for transferring the glass molding material by contacting to the glass molding material, wherein the glass molding material contact portion has a ring shaped edge of an opening or projecting portions arranged coaxially.

This invention relates to a manufacturing method for glass optical elements characterized in press-molding a glass molding material supplied onto a molding surface of a lower mold in utilizing Supplying method No. 1 or Supplying method No. 2 for the glass molding material according to the invention.

DETAILED DESCRIPTION OF THE PREFERRED EMBODIMENTS (Supplying Method No. 1)

Supplying method No. 1 of this invention is a method for supplying a glass molding material onto a molding surface of a lower mold of a mold constituted of an upper mold and the lower mold by dropping the material from a high level, preferably spontaneously dropping the material. The kind, shape, material property, and the like of the mold to which the glass molding material is supplied is not specifically limited. The material property, shape and the like of the glass molding material is not specifically limited either, and the shape can be spherical or slightly flatted shape. The glass molding material can be, e.g., a glass preform or glass gob and can be in a softened state by heating or unheated state. The supplying method according to the invention is, however, particularly effective when the glass molding material is in a softened state by heating because supply by drop of the glass molding material onto the mold surface of the lower mold is effective while the glass molding material is in the softened state by heating.

Drops of the glass molding material from a upper level can be done by, e.g. where a sucking pad sucking the glass molding material is placed or moved above the lower mold, releasing the sucking operation, or, where a separable floating plate holding the glass molding material by blowing air flow is placed or moved, separating the floating plate.

Figure 3:
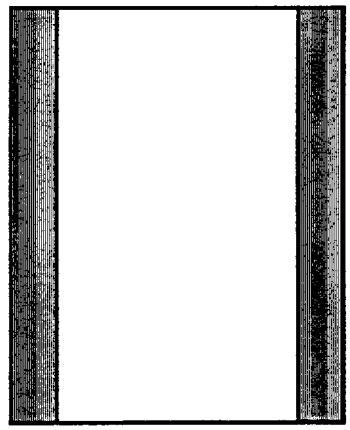
FIG. 3 is a cross section showing another guide means according to another embodiment of the invention.
Figure 4:
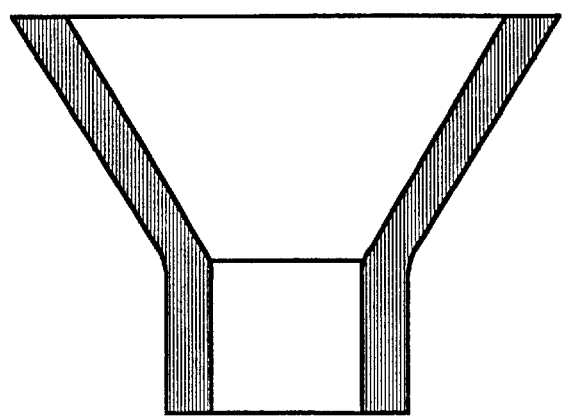
FIG. 4 is a cross section showing another guide means according to another embodiment of the invention.
Figure 5:
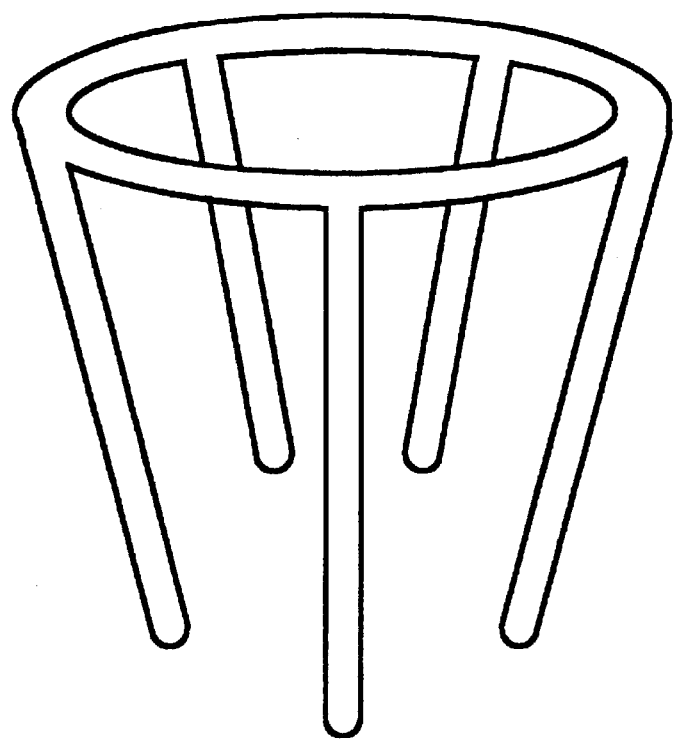
FIG. 5 is a perspective view showing another guide means according to another embodiment of the invention.

In this invented method, though the glass molding material is to be dropped, the glass molding material is preferably dropped substantially vertically. In this invented method, a guide means is used to drop the glass molding material substantially vertically, and the guide means is placed at a position that the glass molding material drops onto the molding surface of the lower mold. The guide means more specifically has a guide portion, which forms a dropping passage of the glass molding material and can make the glass molding material drop substantially vertically. The guide portion forming the dropping passage of the glass molding material of the guide means can be any structure or shape capable of introducing the glass molding material onto the molding surface of the lower mold. For example, a plate shape having a through hole (see, FIGS. 1, 2), a cylindrical shape (see, FIG. 3), a funnel shape (see, FIG. 4), a ring shape having legs (see, FIG. 5) can make the guide portion. The guide means will be described below.

The guide means is placed between a transfer position of the glass molding material and the lower mold at the same time of; before, or after a transfer of the glass molding material above the lower mold. The guide means is preferably disposed near the lower mold from a viewpoint to effectively prevent the glass molding material from jumping out of the mold. The guide means is preferably used upon heated to maintain the temperature of the glass molding material. Particularly, when the glass molding material is softened at $10^{5.5}$ to $10^8$ poises by heating, it is required that the glass molding material is heated up at a temperature such that the glass molding material does not form any so called chill-mark on the glass surface due to contacts with the guide means, and for example, it is preferable that the temperature is higher than a temperature 200° C. below the glass transition point of the glass molding material. Moreover, from a viewpoint to prevent the guide means and the glass molding material from adhering to each other while melting, the temperature is preferably around the glass transition point of the glass molding material (the glass transition point ±100° C., and more preferably, the glass transition point ±50° C.) or below.

(Guide Means)

The guide means of the invention has the guide portion, which forms a dropping passage of the glass molding material and can make the glass molding material drop substantially vertically. The guide means also includes a means to move the guide portion. The dropping passage of the glass molding material preferably has a slightly larger diameter than the diameter of the glass molding material to be passed. The passage more preferably has an inner diameter that becomes smaller as comes closer to the lower end and has a minimum inner diameter slightly larger than the diameter of the glass molding material.

The guide means can be in any shape as far as having a passage of the glass molding material and having a guide portion capable of restricting the dropping position of the glass molding material with respect to a horizontal direction.

Figure 1:
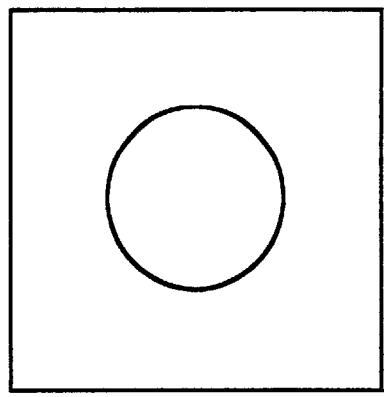
FIG. 1 is a cross section showing a guide means according to a first embodiment of the invention.
Figure 1:
Figure 2:
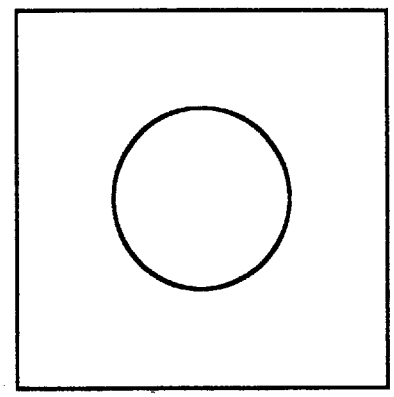
FIG. 2 is a cross section showing another guide means according to another embodiment of the invention.
Figure 2:
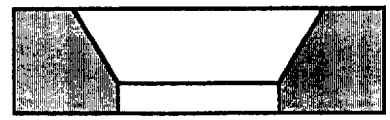

The guide portion can be, e.g., a thick plate having a through hole (see, FIG. 1). The through hole preferably has a funnel shape becoming narrower as closer to the lower end at least partially (FIG. 2). The guide portion can be a substantially cylindrical member (see, FIG. 3). The guide portion can be a member in a funnel shape in which at least a part becomes narrower as closer to the lower end (see, FIG. 4).

The guide portion can be a ring from which three legs or more are protected. The respective legs, from the base to the tip thereof, are inclined toward the center of the ring (see, FIG. 5).

Figure 6:
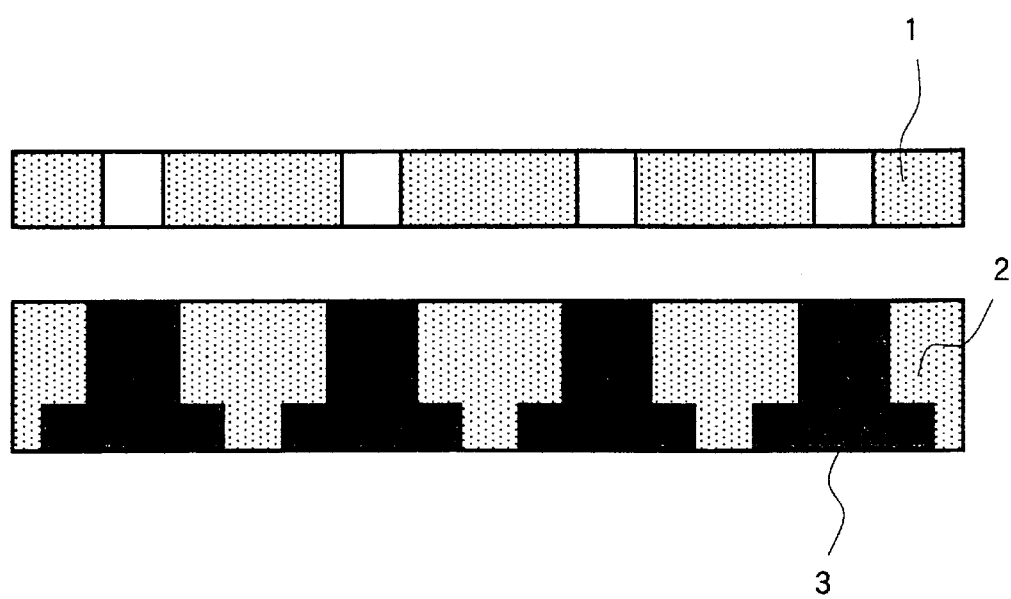
FIG. 6 is a cross section showing another guide means according to another embodiment of the invention.
Figure 7:
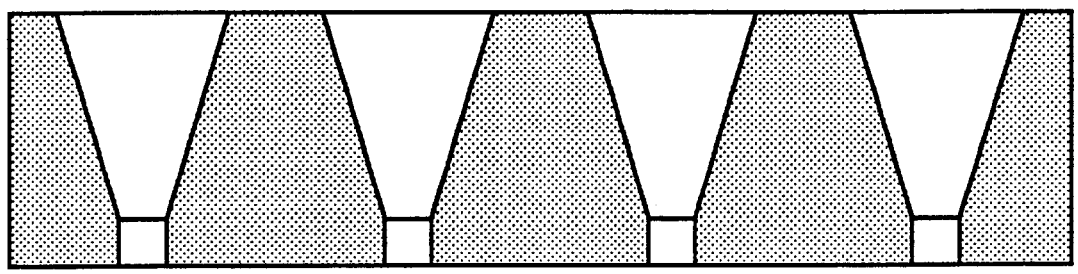
FIG. 7 is a cross section showing another guide means according to another embodiment of the invention.

As shown in FIG. 6, when the mold is constituted of an upper matrix (not shown) and a lower matrix 2 to which plural upper molds (not shown) and plural lower molds 3 are combined respectively, and when the mold is used for molding plural articles at the same time, the guide portion 1 can have a shape in complying with the top surface shape of the matrix, and the plural through holes can be formed at a position where the lower molds are assembled so that all through holes are positioned coaxially with the lower molds, respectively, when set (see, FIG. 6). In this case, at least a part of the through hole is preferably in a funnel shape that becomes narrower as closer to the lower end (see, FIG. 7).

The material property of the guide means is not specifically limited as far as it has heat resistance property. For example, it can be a metal, ceramic, or carbonic material. The dropping passage of the glass molding material of the guide means can be processed with a surface fabrication to make the glass molding material slidable. It is preferable to make the corners existing in each shape rounded to guide the glass molding material smoothly and to prevent the glass molding material from receiving scratches or the like.

The guide means in this invention is for landing the glass molding material at a desired position by exerting opposing force including a vector component toward the desired landing position (center of the mold) at a prescribed timing during a drop of the glass molding material. Therefore, in the guide means used in this invention, the position where the guide means is attached is essential because it makes correction at the prescribed timing.

The operation of the invented guide means is, e.g., as follows:

Where the glass molding material is floated by airflow before dropping, the glass molding material is frequently subject to rotation and vibration movements. At that time, if the glass molding material is released from floating by air flow to drop the glass molding material, inertia force based on the rotation and vibration movements exerts to the glass molding material, and the glass molding material lands at a position shifted horizontally from the released position. Moreover, the operating direction of the kinetic energy that the glass molding material has is changing regularly or irregularly, and depending on a state at a time of release, size and direction of the shifts may vary. However, where the guide means is used, the dropping position can be adjusted since the opposing force having a vector component toward the desired landing position (center of the mold) is given to the inertia force in the horizontal direction as a cause of the shifts.

The timing to exert such opposing force can be selected by selecting height at which the guide means is attached or shape of the guide means. That is, when the guide means is provided at a relatively higher position, the opposing force may be exerted to the glass molding material at a relatively initial stage during drops. If the guide means is provided at a relatively lower position, the opposing force may be exerted to the glass molding material at a relatively late stage during drops.

Arranging plural guide means and use of a wide guide means in a longitudinal direction operates to increase the timing that the glass molding material contacts with the guide means (or namely, the glass molding material receives the opposing force from the guide means). For example, the guide means in FIG. 3 has a tendency to increase timing that the guide means gives the opposing force to the glass molding material in comparison with the guide means in FIG. 1.

Shape and material of the guide means affects direction and size of the opposing force.

To enlarge the size of the guide means in the longitudinal direction can enhance the range of height giving the opposing force.

(Supplying Method No. 2)

Supplying method No. 2 according to the invention is a method for supplying a glass molding material onto a molding surface of a lower mold of a mold constituted of an upper mold and the lower mold and is substantially the same as Supplying method No. 1 with respect to the mold and the glass molding material. However, this method is particularly effective when the shape of the glass molding material is an approximate spherical shape other than a pure spherical shape. The glass molding material in a pure spherical shape, even not supplied to the center of the mold surface, may be movable naturally to the center of the mold by rotation of the material depending on the state of the glass. To the contrary, a spherical shape other than the pure spherical shape, e.g., a slightly flatted spherical shape such as the "marble" shape, may be difficult to move naturally to the center of the mold by rotation of the material where the material is not supplied to the center of the mold. It is to be noted that the supply of the glass molding material to the lower mold can be done by known methods such as dropping the material from, e.g., sucking pads, floating plates, or the like, and preferably done by Supplying method No. 1 according to this invention.

With Supplying method No. 2, after the glass molding material is supplied onto the molding surface of the lower mold, the position of the glass molding material is corrected as to make the vertical center of the glass molding material substantially coincide with the center of the molding surface of the lower mold. This prevents the glass molding material from having an irregular thickness because the glass molding material uniformly spreads in the molds, thereby preventing the glass molding material from protruding out of the molds and defective articles from being produced.

Correction of the position of the glass molding material can be made, e.g., by using a position correcting means whose opening edge is a ring shape or a position correcting means having a glass molding material contact portion having projecting portions arranged coaxially. The structure or the like of the position correcting means will be described below.

Correction of the position can be done by disposing the vertical center of the glass molding material contact portion coincide with the center point of the molding surface of the lower mold and vertically lowering the glass molding material contact portion while in contact with the glass molding material. That is, after the glass molding material is supplied onto the molding surface of the lower mold, the position correcting means is placed or moved over the lower mold so as to make the center of the glass molding material contact portion coincide with the center point of the molding surface of the lower mold. Subsequently, the position correcting means is moved down to come in contact with the periphery of a thickness changing portion of the glass molding material and is further moved down while in contact with the periphery, and thereby the means can correct the position.

Figure 8:
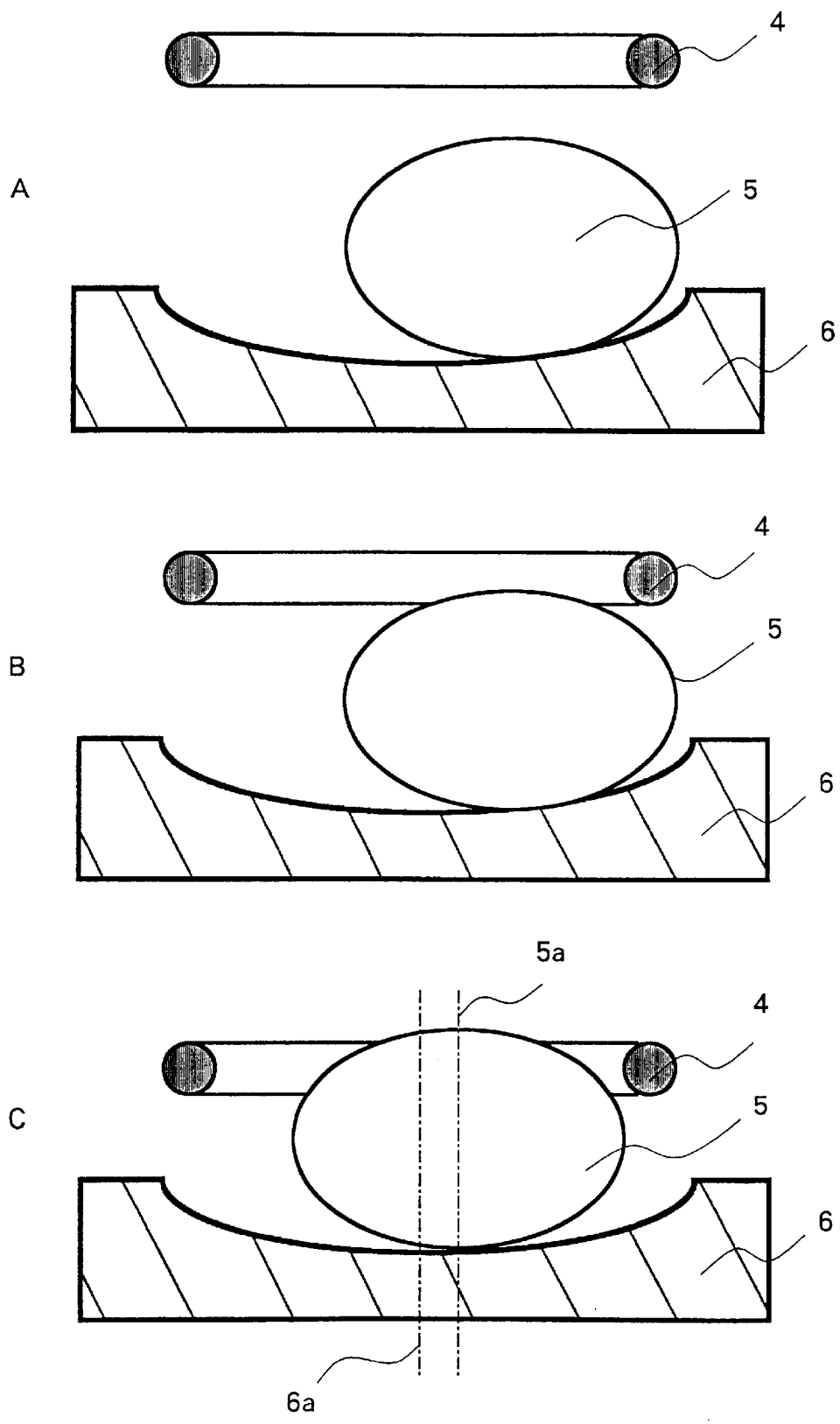
FIG. 8 is an illustration showing a position correcting means while in use according to the invention.

The position correcting means can be, e.g., a means having a ring 4 having a slightly larger diameter than the diameter of the glass molding material as shown in FIG. 8. In this case, correction of the position can be done by the following way. The ring 4 is disposed so that the center thereof coincides with the center 6b of the molding surface 6a of the lower mold 6 (see, FIG. 8A). The ring 4 is then moved vertically down to make in contact with the glass molding material 5 (see, FIG. 8B). The ring 4 is further moved down in pushing the curved surface of the glass molding material 5, and thereby, the center 5a of the glass molding material 5 can be moved as coming closer to the center 6b of the molding surface 6a (see, FIG. 8C).

The contact portion of the position correcting means to the glass molding material can be, in addition to the above ring shape, in any shape as far as capable of contacting with the glass molding material at a position coaxial with the lower mold, e.g., such as the glass molding material contact portion having projecting portions arranged coaxially. The structure or the like of the position correcting means will be described in detail below. The position correcting means is preferably used upon heated to maintain the temperature of the glass molding material. It is to be noted that although there is no limitation to the heating temperature of the position correcting means, it can be, e.g., a temperature of the glass transition point or less.

(Position Correcting Means) The position correcting means can be in any shape as far as contacting with the glass molding material at the position coaxial with the lower mold and can have a glass molding material contact portion having projecting portions arranged in a ring or coaxial shape. The position correcting means can be disposed on the lower mold by means of a proper up and down moving means or reciprocal moving means.

Figure 9:
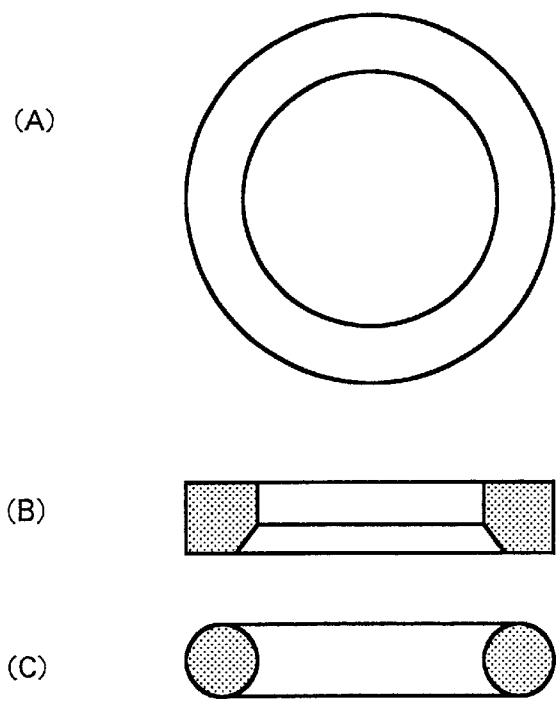
FIG. 9 is an illustration showing a position correcting means according to a first embodiment of the invention.

The position correcting means can be, e.g., a ring 4 (see, FIG. 9A) whose inner diameter is smaller than or substantially equal to the diameter of the glass molding material. The cross-sectional shape of the ring, though can be rectangular, preferably has a tapered shape (see, FIG. 9B) at a contact portion to the glass molding material or a circle shape (see, FIG. 9C). In this case, as described above, the position of the glass molding material can be corrected (see, FIG. 8C) by disposing the ring 4 so that the center coincides with the center of the lower mold 6 in the horizontal direction (see, FIG. 8A), moving vertically downward the ring as to be in contact with the glass molding material 5 (see, FIG. 8B), and moving it downward in pushing the curved surface of the glass molding material. The position correcting means even in any shape as illustrated below can correct the position in basically the same way as far as contacting with the glass molding material at the position coaxial with the lower mold.

Figure 10:
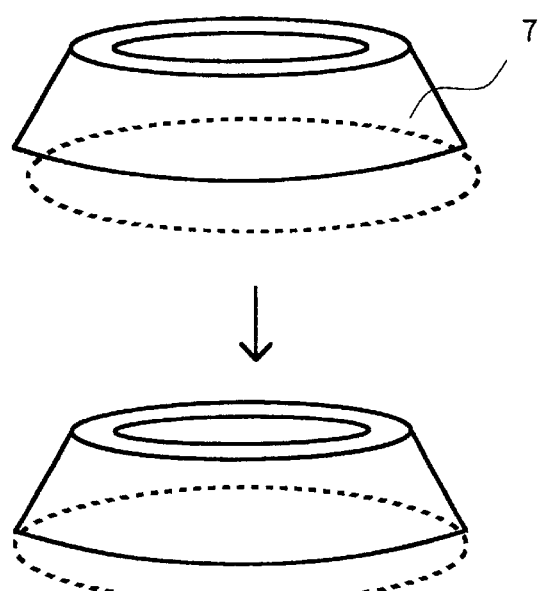
FIG. 10 is an illustration showing another position correcting means according to another embodiment of the invention.
Figure 11:
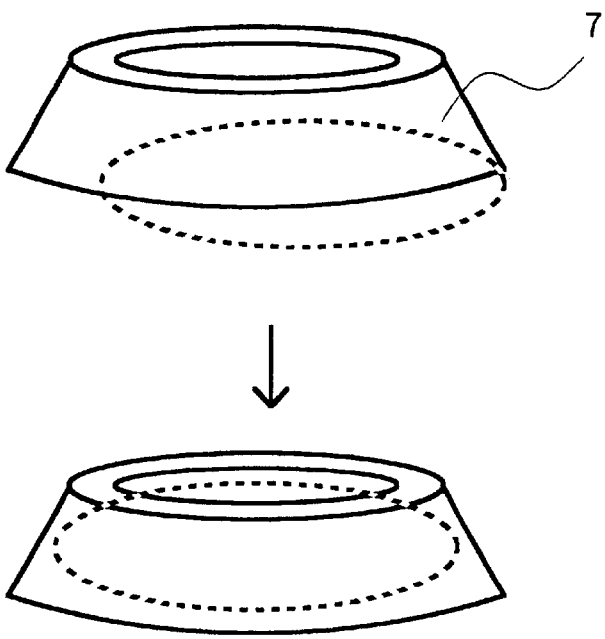
FIG. 11 is an illustration showing another position correcting means according to another embodiment of the invention.

The position correcting means can be, e.g., in a cylindrical shape having an inner diameter larger than or equal to the diameter of the glass molding material. The position correcting means can be in a cylindrical shape whose inner diameter becomes larger as closer to the lower end and at least partially equal to the diameter of the glass molding material. In this case, the position correcting means can work even where the diameter of the glass molding material whose position is to be corrected changes more or less. That is, as shown in FIG. 10, when the inner diameter is substantially the same as the diameter of the glass molding material, the position is corrected at a lower portion of the cylinder 7, and as shown in FIG. 11, when the diameter of the glass molding material is smaller, the position is corrected at a higher portion of the cylinder 7.

Figure 12:
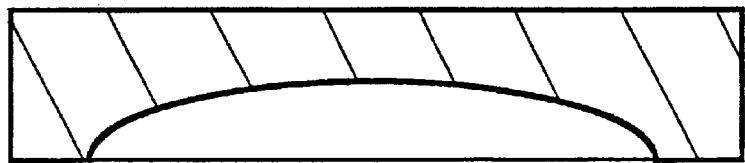
FIG. 12 is a cross section showing another position correcting means according to another embodiment of the invention.
Figure 13:
FIG. 13 is a cross section showing another position correcting means according to another embodiment of the invention.

The position correcting means can be an indentation in a cup shape, whose diameter becomes narrower as comes closer to the top, or an indentation in a reverse truncated cone, formed at a bottom surface of a thick plate (see, FIG. 12, and FIG. 13).

Figure 14:
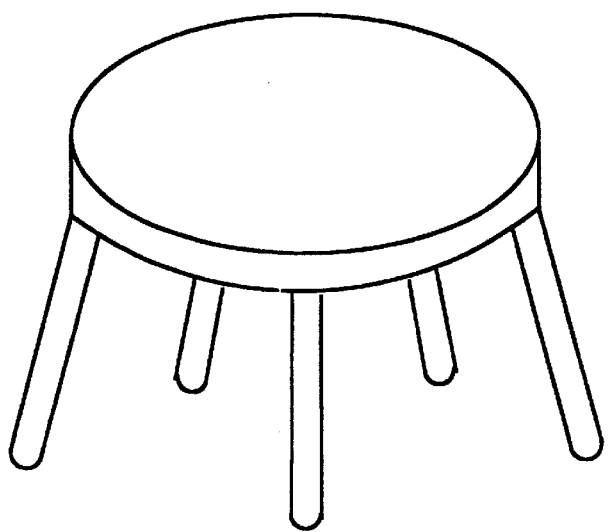
FIG. 14 is a perspective view showing another position correcting means according to another embodiment of the invention.
Figure 15:
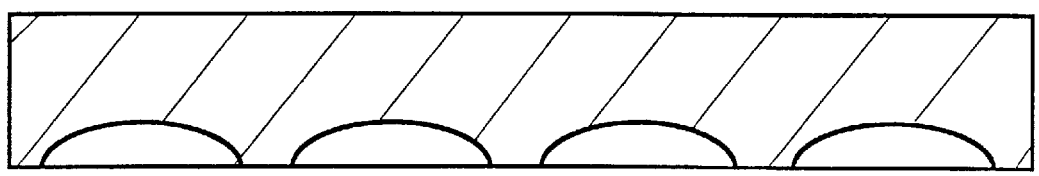
FIG. 15 is a cross section showing another position correcting means according to another embodiment of the invention.
Figure 16:
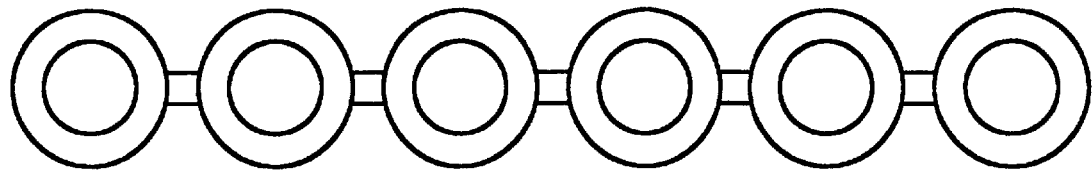
FIG. 16 is a top view showing another position correcting means according to another embodiment of the invention.

The position correcting means can be a member such as a ring or plate from which three or more legs are coaxially protected. Each leg preferably becomes wider between distal and proximal portions (see, FIG. 14).

Where the mold incorporates plural upper and lower molds into upper and lower matrices, the position correcting means can have a lateral cross section in complying with the lateral cross section of the matrix, and the plural through holes and cup shaped or reverse truncated cone shaped indentations can be formed at a position where the lower mold is assembled so that all indentations are coaxial with the lower molds at a time of setting. (see, FIG. 15).

Where the mold incorporates plural upper and lower molds into upper and lower matrices, the position correcting means can be connected rings such that all rings are placed coaxially with the lower molds at a time of setting at a position where the lower mold is assembled (see, FIG. 16).

The member of the position correcting means is not limited as far as the member is heat resistance of some degree. The member can be made of, e.g., metal, ceramic, or carbonic material. The portion of the position correcting means contacting with the glass molding material is preferably processed with a surface fabrication to make the glass molding material slidable. The member is preferably rounded at the corners existing in each shape to prevent the glass molding material from receiving scratches.

The position correcting means is preferably used upon heated to maintain the temperature of the glass molding material. Particularly, when the glass molding material is softened at $10^{5.5}$ to $10^8$ poises by heating, it is required that the glass molding material is heated up at a temperature such that the glass molding material does not form any so called chill-mark on the glass surface due to contacts with the guide means, and for example, it is preferable that the temperature is higher than a temperature 200° C. below the glass transition point of the glass molding material. Moreover, from a viewpoint to prevent the guide means and the glass molding material from adhering to each other while melting, the temperature is preferably around the glass transition point of the glass molding material (the glass transition point ±100° C., and more preferably, the glass transition point ±50° C.) or below.

Supplying methods 1, 2 of the invention, the guide means, the position correcting means are applicable to any method for supplying the glass preforms softened by heating to the molds while floating in, e.g., Japanese Unexamined Patent Publication No. 6-340,430, Japanese Unexamined Patent Publication No. 8-133,758, or Japanese Unexamined Patent Publication No. 8-259,242.

(Manufacturing Method for Glass Optical Elements)

A method for manufacturing glass optical elements is characterized in press-molding a glass molding material supplied to the molding surface of the lower mold by Supplying method No. 1 according to the invention, a glass molding material whose position is corrected by Supplying method No. 2 according to the invention, or a glass molding material, supplied to the molding surface of the lower mold by Supplying method No. 1 according to the invention, whose position is corrected by Supplying method No. 2 according to the invention. There is no special limitation on a method for press-molding the glass molding material, a preheating method of the glass molding material, and the like.

For example, a method for press-molding the glass molding material can include the steps of initially press-molding a glass molding material having a viscosity in a range of $10^{5.5}$ to $10^8$ poises with molds heated at a temperature that the glass molding material shows a viscosity of $10^8$ to $10^{10.5}$ poises (provided that the temperature of the glass molding material is higher than the temperature of the mold), decreasing the temperatures of the mold and the molded glass down to a temperature of the glass transition point or less, and removing the molded glass from the mold.

With this method, the glass material is softened by heating up to a temperature corresponding to a viscosity in a range of $10^{5.5}$ to $10^8$ poises. When the viscosity of the glass material is $10^8$ poises or below, the glass material can be molded where adequately transformed with the mold preheated at a temperature corresponding to the viscosity of $10^8$ to $10^{10.5}$ poises. When the viscosity of the glass material is $10^{5.5}$ poises or above, the glass material is prevented from greatly deformed by its weight before the molding. To make a good molding where the temperature of the mold is set to a relatively low temperature, it is proper that the glass material is softened by heating up to a temperature corresponding to $10^{6.5}$ to $10^{7.6}$ poises.

The preheating temperature of the molds is set to a temperature corresponding to $10^8$ to $10^{10.5}$ poises as a viscosity of the glass material. If the temperature is less than a temperature corresponding to a viscosity of $10^{10.5}$ poises, it is difficult to expand the glass material largely and to obtain a glass molded item having a thin edge thickness, as well as hard to obtain a high precision on the surfaces. If the temperature is more than a temperature corresponding to a viscosity of $10^8$ poises, the cycle time for molding becomes longer than needed, and the life of the molds becomes short. The preheating temperature of the molds is preferably set to a temperature corresponding to $10^8$ to $10^{19.6}$ poises as a viscosity of the glass material.

It is to be noted that the temperature of the mold is set lower than the temperature of the glass molding material. By this setting, the cycle time can be shortened, and the life of the mold can be made longer.

It is very preferable to set the upper mold temperature lower than the lower mold temperature at a starting time of the initial press molding from a viewpoint to prevent the molded article from sticking to the upper mold when the molds are released. More specifically, the upper mold temperature is properly set 5 or 20° C. lower than the lower mold temperature.

The mold used for this invention can be made of molds publicly, previously known as they are. The molding surface of the mold is preferably made of an amorphous and/or crystal, graphite and/or diamond, a carbon film constituted of a single component layer or mixed layer. In the mold having a mold surface constituted of the carbon film thus described, even if the temperature of the mold is the glass transition point of the glass material or above, the glass may not adhere upon melting (or firmly adhere).

The carbon film is formed by means such as a sputtering method, a plasma CVD method, a CVD method, an ion plating method, or the like. When the film is made by a sputtering method, it is preferable to make a sputtering under substrate temperature of 250 to 600° C., Rf power density of 5 to 15 W/cm$^2$, and vacuum degree while sputtering of $5 \times 10^{-4}$ to $5 \times 10^{-1}$ torr, in an inert gas such as Ar as a sputter gas, using a graphite as a sputter target.

When the film is made by a microwave plasma CVD method, it is preferable to made a film under a condition of substrate temperature of 650 to 1000° C., microwave electric power of 200 W to 1 kW, and gas pressure of $10^{-2}$ to 600 torr, using methane gas and hydrogen gas as a source gas.

When the film is made by an ion plating method, it is preferable to set the substrate temperature at 200 to 450° C. and to make benzene gas ionized.

These carbon chains include C—H bond.

The glass molding material supplied onto molding surface of the lower mold can be supplied to the molds upon that the glass molding material is softened by heating while floated by air flow and that the glass molding material softened by heating is dropped. Particularly, it is preferable to soften the glass molding material by heating while floated by air flow and to transfer the glass molding material upon dropping the glass molding material softened by heating onto the preheated mold.

It is not easy to prevent a jig for holding the glass material and the glass from adhering to one another during heating where the glass material is in a low viscosity region such that the glass material may deform by its weight. In this invention, the glass molding material is floated by airflow, e.g., by blowing the gas out of the jig inside. Gas layers are formed on the jig surfaces and the entire surface of each glass material, thereby making possible softening the glass material by heat without reacting the glass material with the jig. When the glass material piece is a preform, the material can be softened by heating while the shape of the preform is almost preserved. When the glass material is a glass gob which has an irregular shape with surface defects such as wrinkles on the material surface, the shape may be regulated and the surface defects may be eliminated, by making the glass material floating by the air flow while the material is softened by heating.

The gas forming the airflow used for floating the glass material is not specifically limited. It is preferable to use a non-oxidizing gas, and for example, nitrogen may be appropriate, from a viewpoint that the heated glass material does not react with the jig and that impairment of the jig due to oxidization of the heated jig is to be prevented. A reducing gas, such as hydrogen gas, may be added to the gas.

The flow amount of the airflow is changeable in consideration of the shape of an air outlet, and the shape and weight of the glass material, etc. A gas flow in a range of 0.005 to 20 liter per minute is generally appropriate for floating the glass material. If the gas flow is less than 0.005 liter per min, the glass material may not be floated adequately where the glass material has a weight of 300 mg or more. If the gas flow exceeds 20 liter per minute, the glass on the floating plate jig may be staggered even where the glass weight is 2000 mg or more, thereby rendering the glass shape possibly deform during heating where the glass material is a perform.

The condition for softening the glass material by heating can be changed properly depending on types of the glass, and so on, and is adjusted so that the softened glass has a required viscosity.

EXAMPLES

Hereinafter, this invention is described based on Examples

Example 1

Figure 17:
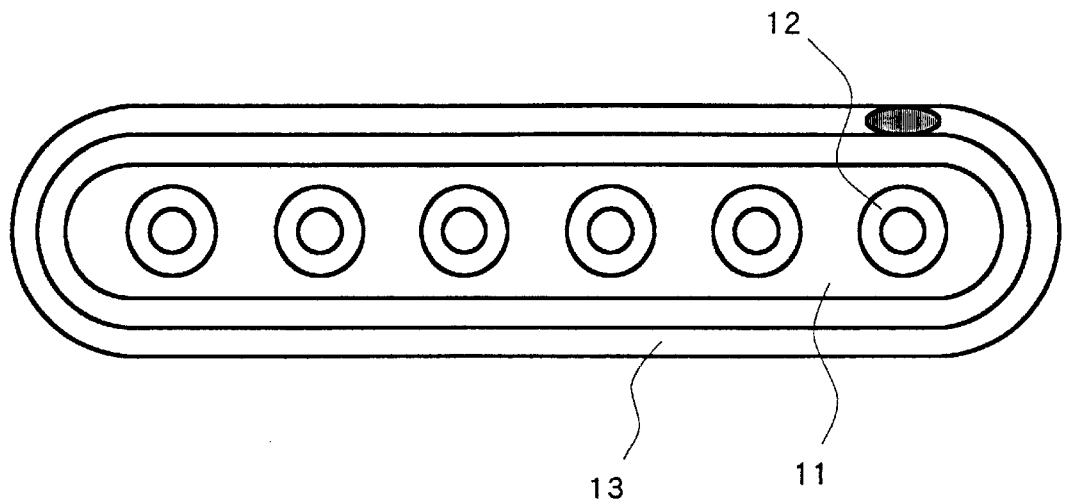
FIG. 17 is a cross section showing a molding apparatus used for the method according an embodiment of the invention.

In a molding apparatus for supplying a glass molding material according to a method of this Example, upper and lower matrices extending in a longitudinal direction are attached to upper and lower shafts of presses, and respective six of upper molds (not shown) and lower molds 12 are attached to the upper matrix (not shown) and the lower matrix 11. Induction heating coils 13 wound around the upper and lower matrices in complying with the longitudinal form of the matrices are disposed at two positions, or namely, around the upper and lower matrices, respectively (see, FIG. 17). The coils of upper and lower sides are spaced by 20 mm.

With this apparatus, biconvex lenses having an outer diameter of 10 mm are molded by pressing barium borosilicate glass (transition point 514° C., sag point 545° C.).

Figure 18:
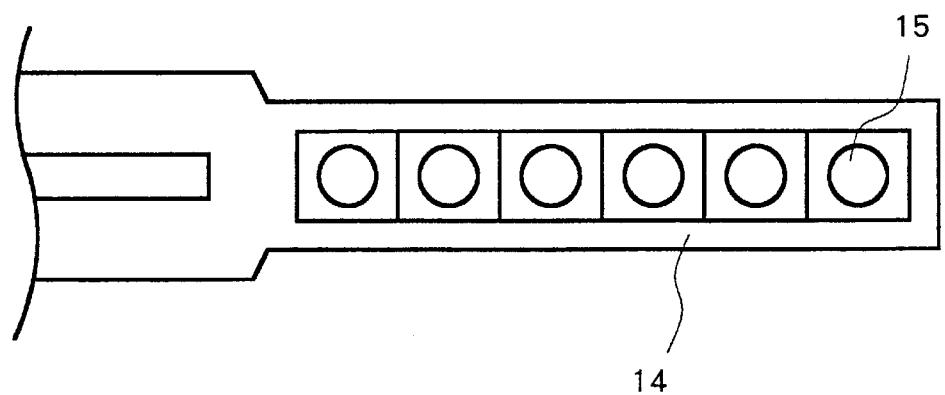
FIG. 18 is a top view showing a separable floating plate used for the method according an embodiment of the invention.

Six pieces of spherical glass molding materials were heated and softened while floated by air flow blown from a lower side on six separable floating plates 15 (made of glassy carbon) arranged in a straight line on a support arm 14 openable shown in FIG. 18. Subsequently, the support arm 14 was inserted between the upper and lower induction heating coils 13 and placed right over the plural lower mold 12. At the same time, a guide means 17 forming six through holes 16 in a funnel shape bored in a longitudinal plate shown in FIG. 19 was inserted between the support arm 14 and the lower molds 12. Then, by quickly opening the support arm 14, the plural floating plates 15 were separated to left and right sides, thereby supplying the plural glass molding materials onto the lower molds 12 by dropping simultaneously the plural glass molding materials onto the lower molds 12, respectively, from the corresponding floating plates 15 (see, FIG. 20). All of the glass molding materials was supplied to the respective centers of the lower molds 12. It is to be noted that the guide means 17 was set at 400° C. lower than the glass transition temperature (514° C.) of the glass molding material, and there was no adherence of the glass molding material to the guide means 17.

Then, the support arm and guide means were retired from the space over the lower molds, and the power for high frequency was turned off, and a press was made by elevating the lower matrix. Although such a manipulation was repeated 1000 times, the glass molding material did not jump out of the molds, and lenses having a high quality were stably obtained.

Example 2

With the mold substantially the same as that in Example 1, biconvex lenses made of pressing barium borosilicate glass were molded. In this Example, however, glass molding material pieces thermally molded into a marble shape (diameter 7 mm, height 4.5 mm) as glass molding materials were used, and a guide means was used in the same way as in Example 1. Furthermore, positions were corrected by the position correcting means after the glass molding materials were dropped from the separable floating plates to the lower molds.

As the position correcting means, a member connecting six rings having an inner diameter slightly larger than the diameter of the glass molding material, as shown in FIG. 16, was used.

Figure 19:
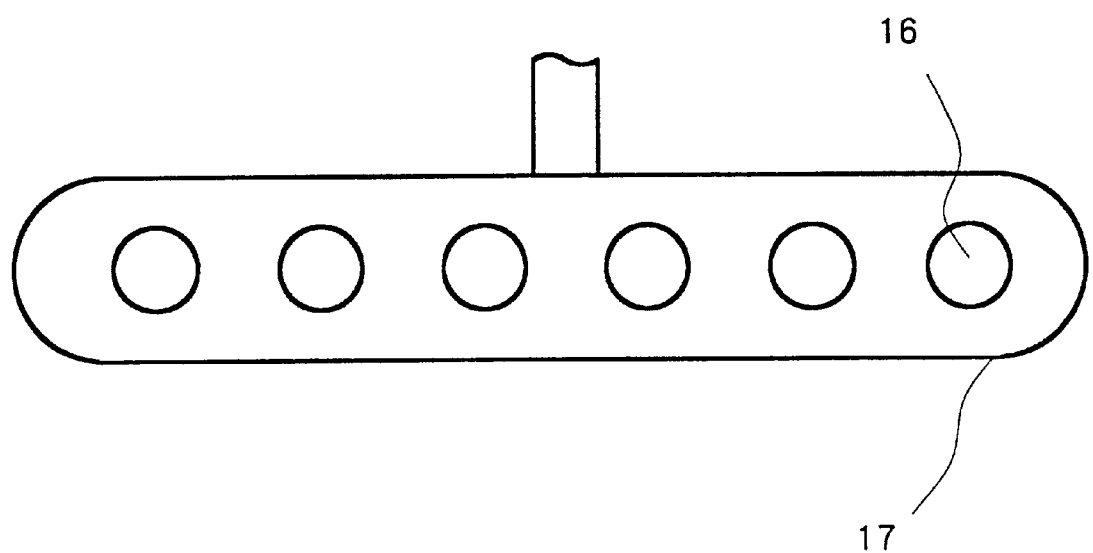
FIG. 19 is a top view showing a position correcting means used for the method according an embodiment of the invention.
Figure 20:
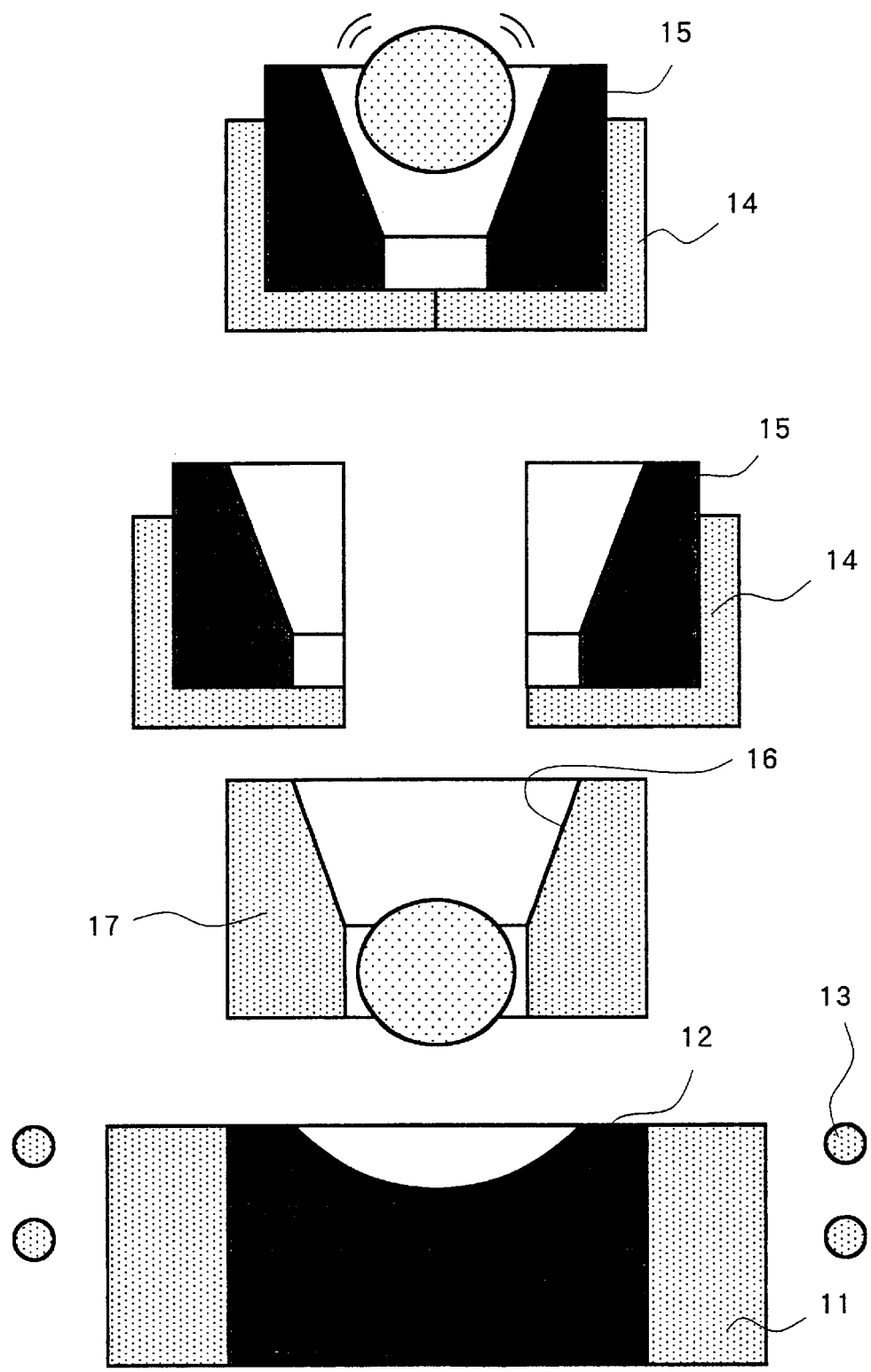
FIG. 20 is a cross section showing a method according an embodiment of the invention.
Figure 21:
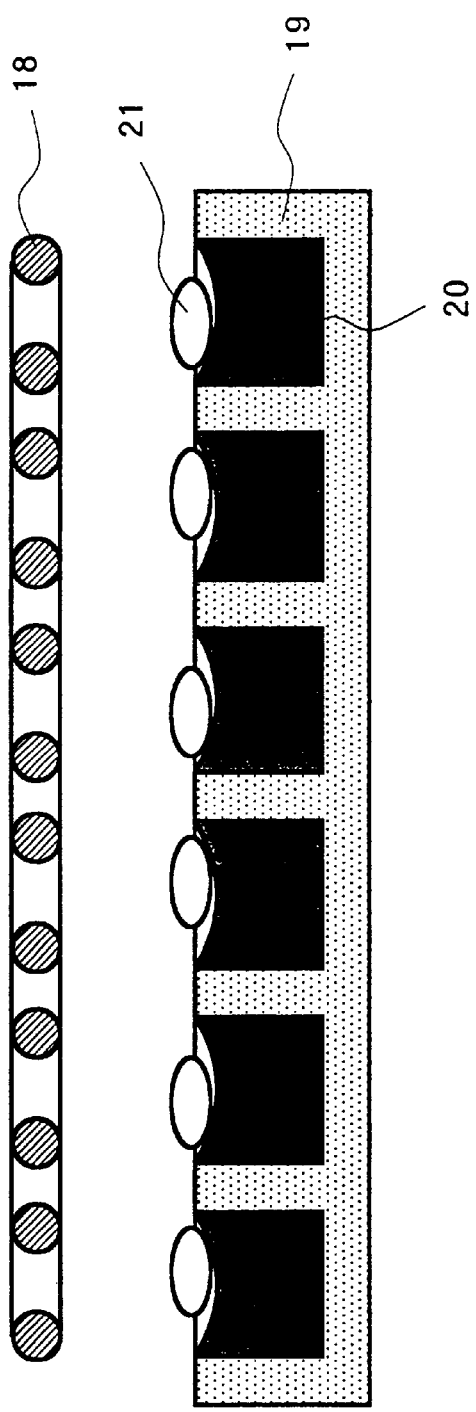
FIG. 21 is a cross section showing another method according an embodiment of the invention.

First, as shown in FIG. 21, the position correcting means 18 was disposed to meet the centers of the respective rings with the corresponding centers of the lower molds (see, FIG. 19). Then, the means was moved down toward the lower molds 20 set in the lower matrix 19, and the respective rings were made in contact with the respective glass molding material on the lower molds 20. When the position correcting means 18 was further moved down, the glass molding material 21 slides to the center of the lower mold, thereby meeting the center of the glass molding material 21 with the center of the lower mold 20, and perfecting the correction of positions. Then, a press was made in substantially the same way as in Example 1. Lenses having a good quality were obtained under any condition shown in Table 1.

TABLE 1

| Glass Molding Material Temperature (Viscosity) | Press Starting Time | |
|---|---|---|
| | Mold Temperature (Viscosity) | Mold-releasing Temperature |
| 680 ($10^{5.8}$) | 549 ($10^{10.2}$) | 485 |
| 643 ($10^{6.6}$) | 567 ($10^{9.2}$) | 495 |
| 615 ($10^{7.4}$) | 590 ($10^{8.2}$) | 505 |

Temperature: °C.,
Viscosity: poise

According to this invention, a method and an apparatus can be provided in which a glass molding material during drops is prevented from jumping out of a mold, where the glass molding material is supplied by dropping the glass molding material.

Moreover, according to this invention, a method and an apparatus can be provided in which the glass molding material is positioned approximately at the center of the molding surface of the lower mold, where the glass molding material is supplied by dropping the glass molding material.

Using the supplying method and apparatus for molding material for optical elements according to the invention allows optical elements to be stably produced with a good quality.

What we claim is:

1. A method for supplying a piece of glass molding material for an optical article by dropping the glass molding material downward onto a molding surface of a lower mold of a mold constituted of an upper mold and the lower mold, comprising the steps of using a guide means for dropping the glass molding material, and providing the guide means at a position making the glass molding material drop onto a molding surface of the lower mold, wherein the guide means is heated at a temperature such that the glass molding material does not form a chill-mark on the glass surface.

2. The method according to claim 1, wherein the guide means is for dropping the glass molding material substantially vertically.

3. The method according to claim 1, wherein the guide means forms a dropping passage of the glass molding material and has a guide portion allowing the glass molding material to be dropped substantially vertically.

4. The method according to claim 1, wherein the guide means is heated at a temperature equal to or less than the glass transition temperature of the glass molding material.

5. A method for manufacturing glass optical elements, wherein the glass molding material supplied onto a molding surface of a lower mold according to the method as set forth in claim 1 is press-molded.

6. The method for manufacturing glass optical elements according to claim 5, wherein the glass molding material is softened by heating while floated by air flow and wherein the softened glass molding material is supplied to the mold.

7. The method for manufacturing glass optical elements according to claim 5, wherein a method for press-molding the glass molding material includes the steps of initially press-molding a glass molding material having a viscosity in a range of $10^{5.5}$ to $10^8$ poises with molds heated at a temperature that the glass molding material shows a viscosity of $10^8$ to $10^{10.5}$ poises, wherein the temperature of the glass molding material is higher than the temperature of the mold, decreasing the temperatures of the mold and the molded glass down to a temperature of the glass transition point or less, and removing the molded glass from the mold.

8. The method for manufacturing glass optical elements according to claim 7, wherein the glass molding material is softened by heating while floated by air flow and wherein the softened glass molding material is supplied to the mold.

9. The method for supplying a glass molding material onto a molding surface of a lower mold of a mold constituted of an upper mold and the lower mold in accordance with claim 1, wherein the position of the glass molding material is corrected so that a vertical center of the glass molding material and a center point of a molding surface substantially coincide with each other, after the glass molding material is supplied onto the molding surface of the lower mold.

10. The method according to claim 4, wherein the guide means is heated at a temperature higher than a temperature 200° C. below the glass transition temperature of the glass molding material.

11. The method according to claim 1, wherein the guide means is heated at a temperature of the glass transition temperature of the glass molding material ±100° C.

12. The method according to claim 5, wherein the guide means is heated at a temperature higher than a temperature 200° C. below the glass transition temperature of the glass molding material.

13. The method according to claim 5, wherein the guide means is heated at a temperature of the glass transition temperature of the glass molding material ±100° C.

14. The process according to claim 5, wherein the guide means forms a dropping passage of the glass molding material and has a guide portion allowing the glass molding material to be dropped substantially vertically, and the center of the means coincides with the center of the molding surface of the lower mold.

15. A method for manufacturing glass optical elements which comprises supplying a glass molding material onto a molding surface of a lower mold of a mold comprising an upper mold and the lower mold, correcting the position of the glass molding material supplied to the molding surface of the lower mold by moving down a position correcting means in contact with the glass molding material, wherein the center of the means coincides with the center of the molding surface of the lower mold, and press molding the glass molding material.

16. The method for manufacturing glass optical elements according to claim 15, wherein the glass molding material is softened by heating while floated by air flow and wherein the softened glass molding material is supplied to the mold.

17. The method for manufacturing glass optical elements according to claim 15, wherein a method for press-molding the glass molding material includes the steps of initially press-molding a glass molding material having a viscosity in a range of $10^{5.5}$ to $10^8$ poises with molds heated at a temperature that the glass molding material shows a viscosity of $10^8$ to $10^{10.5}$ poises, wherein the temperature of the glass molding material is higher than the temperature of the mold, decreasing the temperatures of the mold and the molded glass down to a temperature of the glass transition point or less, and removing the molded glass from the mold.

18. The method for manufacturing glass optical elements according to claim 17, wherein the glass molding material is softened by heating while floated by air flow and wherein the softened glass molding material is supplied to the mold.

19. The method according to claim 15, wherein the position correcting means is an indentation in a cup shape, whose diameter narrows closer to the top, or an indentation in a reverse truncated cone, formed at a bottom surface of a thick plate.

20. The process according to claim 15, wherein the correction of the position is performed so that a vertical center of the glass molding material and the center point of the molding surface of the lower mold substantially coincide with each other.

21. The process according to claim 15, wherein the position correcting means has a glass molding material contact portion in which an edge of an opening is in a ring shape or rectangular, or in which projecting portions are arranged coaxially.

22. The process according to claim 21, wherein the glass molding material contact portion has an inner diameter becoming larger as closer to the lower end of an opening(s) wherein the inner diameter is determined by a portion(s) which will be in contact with a glass molding material.

23. The process according to claim 21, wherein the glass molding material contact portion has a tapered shape at least close to the lower end of an opening(s).

24. The process according to claim 21, wherein the glass molding material contact portion has a curved surface.

25. The process according to claim 15, wherein the position correcting means is an indentation in a cup shape, whose diameter becomes narrower as comes closer to the top or an indentation in a reverse truncated cone.

26. A method for manufacturing glass optical elements by supplying a glass molding material onto a molding surface of a lower mold of a mold comprising an upper mold and the lower mold, with the glass molding material supplied to the molding surface of the lower mold being press molded, and with the position of the glass molding material being corrected so that a vertical center of the glass molding material and a center point of a molding surface substantially coincide with each other, after the glass molding material is supplied onto the molding surface of the lower mold, wherein the guide means is heated at a temperature higher than a temperature 200° C. below the glass transition temperature of the glass molding material.

27. A method for manufacturing glass optical elements by supplying a glass molding material onto a molding surface of a lower mold of a mold comprising an upper mold and the lower mold, with the glass molding material supplied to the molding surface of the lower mold being press molded, and with the position of the glass molding material being corrected so that a vertical center of the glass molding material and a center point of a molding surface substantially coincide with each other, after the glass molding material is supplied onto the molding surface of the lower mold, wherein the glass molding material is supplied to the molding surface of the lower mold using guide means heated at a temperature of the glass transition temperature of the glass molding material ±100° C.

\* \* \* \* \*